United States Patent
Bayeh

(10) Patent No.: US 6,223,202 B1
(45) Date of Patent: *Apr. 24, 2001

(54) VIRTUAL MACHINE POOLING

(75) Inventor: Elias Naji Bayeh, Cary, NC (US)

(73) Assignee: International Business Machines Corp., Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/092,346

(22) Filed: Jun. 5, 1998

(51) Int. Cl.$^7$ ........................................... G06F 9/00
(52) U.S. Cl. .................. 709/102; 709/1; 709/105
(58) Field of Search ................. 709/1, 203, 102, 709/105

(56) References Cited

U.S. PATENT DOCUMENTS

| | | | |
|---|---|---|---|
| 4,914,619 | * | 4/1990 | Harris et al. ........................ 709/227 |
| 5,230,069 | * | 7/1993 | Brelsford et al. .................... 709/100 |
| 5,555,385 | * | 9/1996 | Osisek ..................................... 711/1 |
| 5,692,193 | * | 11/1997 | Jagannathan et al. ............... 709/106 |
| 5,928,323 | * | 7/1999 | Gosling et al. ...................... 709/203 |

* cited by examiner

Primary Examiner—Alvin E. Oberley
Assistant Examiner—Van Hoa Nguyen
(74) Attorney, Agent, or Firm—A. Bruce Clay; Marcia L. Doubet

(57) ABSTRACT

A technique, system, and computer program for enabling multiple virtual machines to execute on a single server, using virtual machine pooling. This will result in a more scalable network environment, increasing the processing capacity of the server and decreasing the amount of time a particular request waits before being processed. Further, the integrity of an application's data will be protected from inadvertent overwriting by another application, because each application can be running in a separate virtual machine. Garbage collection, crashes, and hangs will no longer temporarily or completely halt a server: when one virtual machine halts, others can continue executing. Multiple environments can now execute on a single server, including different versions of virtual machines, increasing the mix of servlets that can be supported. Further, debugging can now occur concurrently with normal application execution, by isolating the debugging function to a specific virtual machine.

18 Claims, 9 Drawing Sheets

VIRTUAL MACHINE POOLING

BACKGROUND OF THE INVENTION

1. Field of the Invention

The present invention relates to computer communication, and deals more particularly with a technique, system, and computer program for enhancing performance of the computers responsible for one side of the communications in a scalable, clustered network environment. This is done by creating a pool of virtual machines, enabling the applications running on the computer to be more scalable, manageable, reliable, secure, and faster.

2. Description of the Related Art

The Internet is a vast collection of computing resources, interconnected as a network, from sites around the world. It is used every day by millions of people. The World Wide Web (referred to herein as the "Web") is that portion of the Internet which uses the HyperText Transfer Protocol ("HTTP") as a protocol for exchanging messages. (Alternatively, the "HTTPS" protocol can be used, where this protocol is a security-enhanced version of HTTP.)

A user of the Internet typically accesses and uses the Internet by establishing a network connection through the services of an Internet Service Provider (ISP). An ISP provides computer users the ability to dial a telephone number using their computer modem (or other connection facility, such as satellite transmission), thereby establishing a connection to a remote computer owned or managed by the ISP. This remote computer then makes services available to the user's computer. Typical services include: providing a search facility to search throughout the interconnected computers of the Internet for items of interest to the user; a browse capability, for displaying information located with the search facility; and an electronic mail facility, with which the user can send and receive mail messages from other computer users.

The user working in a Web environment will have software running on his computer to allow him to create and send requests for information, and to see the results. These functions are typically combined in what is referred to as a "Web browser", or "browser". After the user has created his request using the browser, the request message is sent out into the Internet for processing. The target of the request message is one of the interconnected computers in the Internet network. That computer will receive the message, attempt to find the data satisfying the user's request, format that data for display with the user's browser, and return the formatted response to the browser software running on the user's computer.

This is an example of a client-server model of computing, where the machine at which the user requests information is referred to as the client, and the computer that locates the information and returns it to the client is the server. In the Web environment, the server is referred to as a "Web server". The client-server model may be extended to what is referred to as a "three-tier architecture". This architecture places the Web server in the middle tier, where the added tier typically represents data repositories of information that may be accessed by the Web server as part of the task of processing the client's request. This three-tiered architecture recognizes the fact that many client requests do not simply require the location and return of static data, but require an application program to perform processing of the client's request in order to dynamically create the data to be returned. In this architecture, the Web server may equivalently be referred to as an "application server".

The Java programming language is gaining wide acceptance for writing Web applications, as it is a robust portable object-oriented language defined specifically for the Web environment. ("Java" is a trademark of Sun Microsystems, Inc.) Java attains its portability through use of a specially-designed virtual machine ("VM"). This virtual machine is also referred to as a "Java Virtual Machine", or "JVM". In this context, the purpose of the virtual is machine is to enable isolation of the details of the underlying hardware from the compiler used to compile the Java programming instructions. Those details are supplied by the implementation of the virtual machine, and include such things as whether little Endian or big Endian format is used for storing compiled instructions, and the length of an instruction once it is compiled. Because these machine-dependent details are not reflected in the compiled code, the code can be transported to a different environment (a different hardware machine, a different operating system, etc.), and executed in that environment without requiring the code to be changed or recompiled. The compiled code, referred to as Java "bytecode", then runs on top of a JVM, where the JVM is tailored to that specific environment. As an example of this tailoring of the JVM, if the bytecode is created using little Endian format but is to run on a microprocessor expecting big Endian, then the JVM would be responsible for converting the instructions from the bytecode before passing them to the microprocessor.

A Web server that implements a Java Virtual Machine can be functionally extended using Java "servlets". A servlet is a relatively small executable code object that can be dynamically plugged in, or added, to the code running on the server. Servlets typically perform some specialized function, which can be invoked by the server (or by another servlet) to extend its own functionality. The servlet processes the request, and returns the response to the server (or servlet) that invoked it.

A Java Virtual Machine runs multiple threads within a single process. A process is an instance of a running program, which has state information associated with it such as the current values of registers, the current instruction being executed, file descriptors for files that have been opened by the program, etc. Multiprogramming is accomplished by using multiple threads in this process, where a thread is a single execution of a program supporting concurrent execution (i.e. a re-entrant program). The operating system maintains information about each concurrent thread that enables the threads to share the CPU in time slices, but still be distinguishable from each other. For example, a different current instruction pointer is maintained for each thread, as are the values of registers. Thus, the different threads can execute sequentially within one process.

Any number of servlets can be running within one server, using the server's single process, at any given time. However, as more servlets are invoked, more threads are competing for the allocation of time slices, and performance of the JVM begins to degrade. With a relatively small number of servlets running, the performance of a time-critical application can degrade to the point where the application is effectively unusable. Because Web applications typically have a human user waiting for the response to the client requests, responses must be returned very quickly, or the user will become dissatisfied with the service. A particular server may receive thousands, or even millions, of client requests in a day's time. These requests must all be handled with acceptable response times, or the users may switch to a competitor's application services.

Further, this single-process approach to executing multiple threads can lead to complete unavailability of a server in certain situations. If one of the threads crashes, or hangs the system, as it is executing, then the single executing sequence of code crashes or hangs. Or, if the operating system invokes garbage collection, then execution of application programs to process client requests will halt until the garbage collection is finished. This interruption in service, either temporary (for garbage collection) or complete (when code crashes or hangs), is intolerable in many of today's time-sensitive Web applications.

Additionally, servlets running on a particular JVM may interfere with one another, either intentionally or unintentionally. Because the servlets all run as threads in the same process, the resources of the process are not saved separately for each thread when that thread is swapped out from using the CPU. This enables very fast switching from execution of one servlet (i.e. the thread for a servlet) to another, but at the expense of not isolating one servlet's data from another's. For example, one servlet can overwrite any location in the memory available to the process, even if another servlet depends on the contents of that memory location being unchanged. Or, if one servlet opens a file, all servlets see that file as being opened and can read or write data in the file, even though one servlet may have been written to expect exclusive access to the file contents.

Because all the servlets of a particular server ran in threads on the same JVM, there is currently no way to run more than one execution environment (which includes the version of Java being executed) at the same time. While many implementations will never need more than one environment or Java version, there are other situations where it would be very beneficial to allow a mixture (such as allowing concurrent use of versions from different vendors). For example, some servlets may require a particular virtual machine, such as servlets using Microsoft Corporation's ActiveX: these servlets require the Microsoft virtual machine. If this virtual machine was the only one available, then servlets requiring some different virtual machine (such as from a different vendor) could not run in that environment.

Accordingly, a need exists for a technique by which these shortcomings in the current implementation of virtual machines on servers can be overcome. The proposed technique defines a way to use multiple virtual machines, referred to as a "pool" of virtual machines, within a single server. This technique enables the number of servlets executing on behalf of a single server to be increased without degrading the server's performance. Further, it enables a protection mechanism to be implemented that prohibits the servlets of one application from interfering with the servlets of another application, and allows different execution environments (including different versions of Java) to be used concurrently. By executing multiple virtual machines per server, a server will no longer be completely unavailable if one thread crashes, hangs, or is interrupted.

SUMMARY OF THE INVENTION

An object of the present invention is to provide a technique whereby multiple virtual machines can be used in a single server, resulting in a more scalable, clustered network environment.

Another object of the present invention is to provide a technique whereby these virtual machines can execute as different execution environments.

It is another object of the present invention to provide these multiple virtual machines in a way that protects the integrity of application data such that applications do not inadvertently overwrite each other's data.

It is a further object of the present invention to provide a technique which reduces the likelihood that a server will be temporarily or permanently unavailable.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a software-implemented process for use in a computing environment having a connection to a network, for improving server performance by pooling virtual machines, comprising: at least one server; a plurality of virtual machines executing on each of the servers; and at least one servlet executing on each of the virtual machines. A plurality of client requests is included, and each of the servers preferably further comprises: a subprocess for receiving the client requests sent to this server; and a subprocess for forwarding each of the received requests to a dispatcher. Additionally, a subprocess for dispatching the forwarded requests to a selected one of the plurality of virtual machines may be used, and each of the virtual machines may further comprise a subprocess for listening for the forwarded requests. The subprocess for listening preferably further comprises a subprocess for assigning each of the forwarded requests to a selected one of the servlets executing on the virtual machine. The subprocess for dispatching may further comprise a subprocess for selecting the selected virtual machine using a URL mask. Optionally, a subprocess for obtaining configuration information for the pool may be included, this configuration information enabling a user to specify the number of virtual machines to execute in selected ones of the servers.

The present invention will now be described with reference to the following drawings, in which like reference numbers denote the same element throughout.

DESCRIPTION OF THE PREFERRED EMBODIMENT

Figure 1:
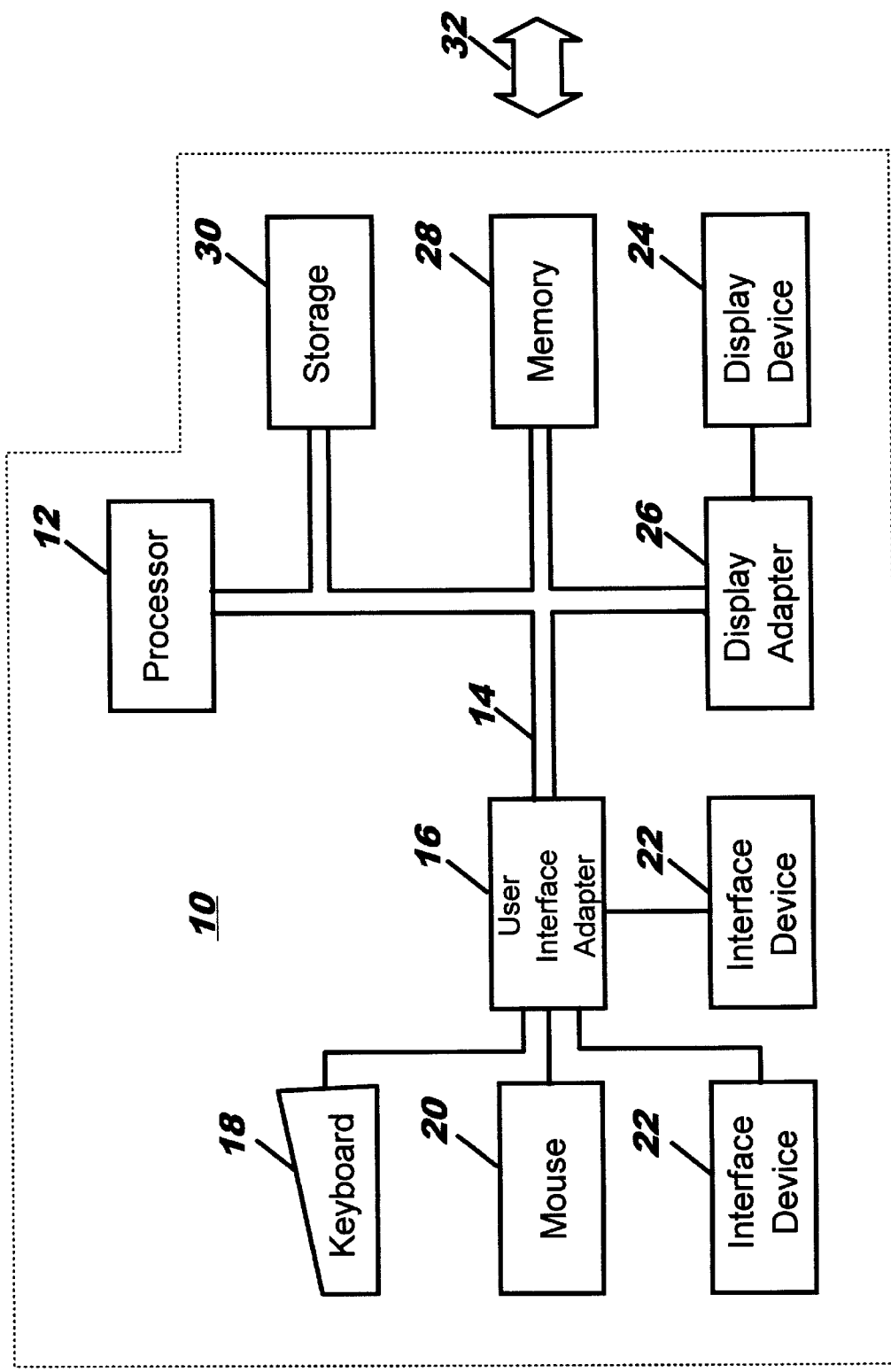
FIG. 1 is a block diagram of a computer workstation environment in which the present invention may be practiced.

FIG. 1 illustrates a representative workstation hardware environment in which the present invention may be practiced. The environment of FIG. 1 comprises a representative computer or intelligent workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 communicates via a communications channel 32 with other computers or networks of computers. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Figure 2:
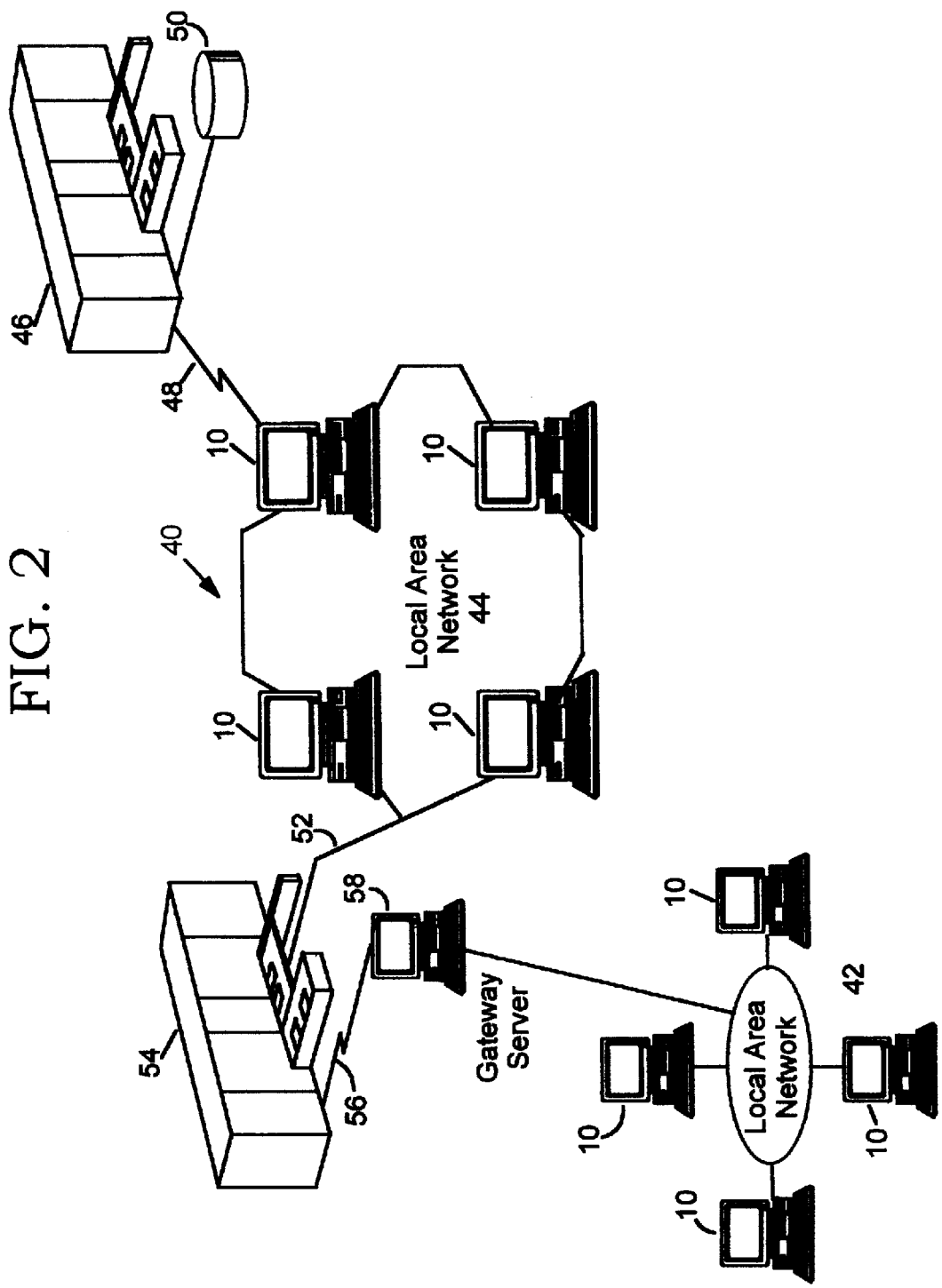
FIG. 2 is a diagram of a networked computing environment in which the present invention may be practiced.

FIG. 2 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers or servers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from IBM. Depending on the application, a midrange computer, such as an Application System/400 (also known as an AS/400) may be employed. "Enterprise Systems Architecture/370" is a trademark of IBM; "Enterprise Systems Architecture/390", "Application System/400", and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically accessed by the microprocessor 12 of the workstation 10 from long-term storage media 30 of some type, such as a CD-ROM drive or hard drive. In a clustered Web server environment, such software programming code may be stored with storage associated with a server. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

The virtual machine pooling facilities implementing the present invention may be stored on any of the various media types used by the long-term storage 30. This code will typically be installed in a server such as server 46, which processes requests that come from a user having a computer such as the workstation 10.

While servers in Web environments may not typically include a display device 24, the preferred embodiment of the present invention uses a display device 24 in order to allow configuration of parameters (for example, by a system administrator) that are required for pooling the virtual machines.

The preferred embodiment of the present invention will now be discussed with reference to FIGS. 3 through 5.

In the preferred embodiment, the present invention is implemented as a computer software program. This program will be used where a client has sent a request for data to a server, and comprises part of the processing done on the server side of the network. Typically, the program will be used in an Internet environment, where the server is a Web server and the request is formatted using HTTP (or HTTPS). Alternatively, the connection may be to a corporate intranet (that is, a network owned or managed internally to the user's company) of which the user's computer is a component, where this corporate intranet provides services in a similar manner to the Internet. Use of the tern "Internet" herein, when discussing processing associated with the user's request, includes processing that occurs in an intranet, unless otherwise stated. The program code of the preferred embodiment may be implemented as objects in an object-oriented programming language such as Java. However, the inventive concepts of the present invention are not limited to implementation in an object-oriented environment, nor to implementation in the Java language. Conventional procedure-oriented languages, such as the "C" programming language, may be used instead of an object-oriented language. Or, a mix of procedural language and object-oriented language programming may be used.

Figure 3:
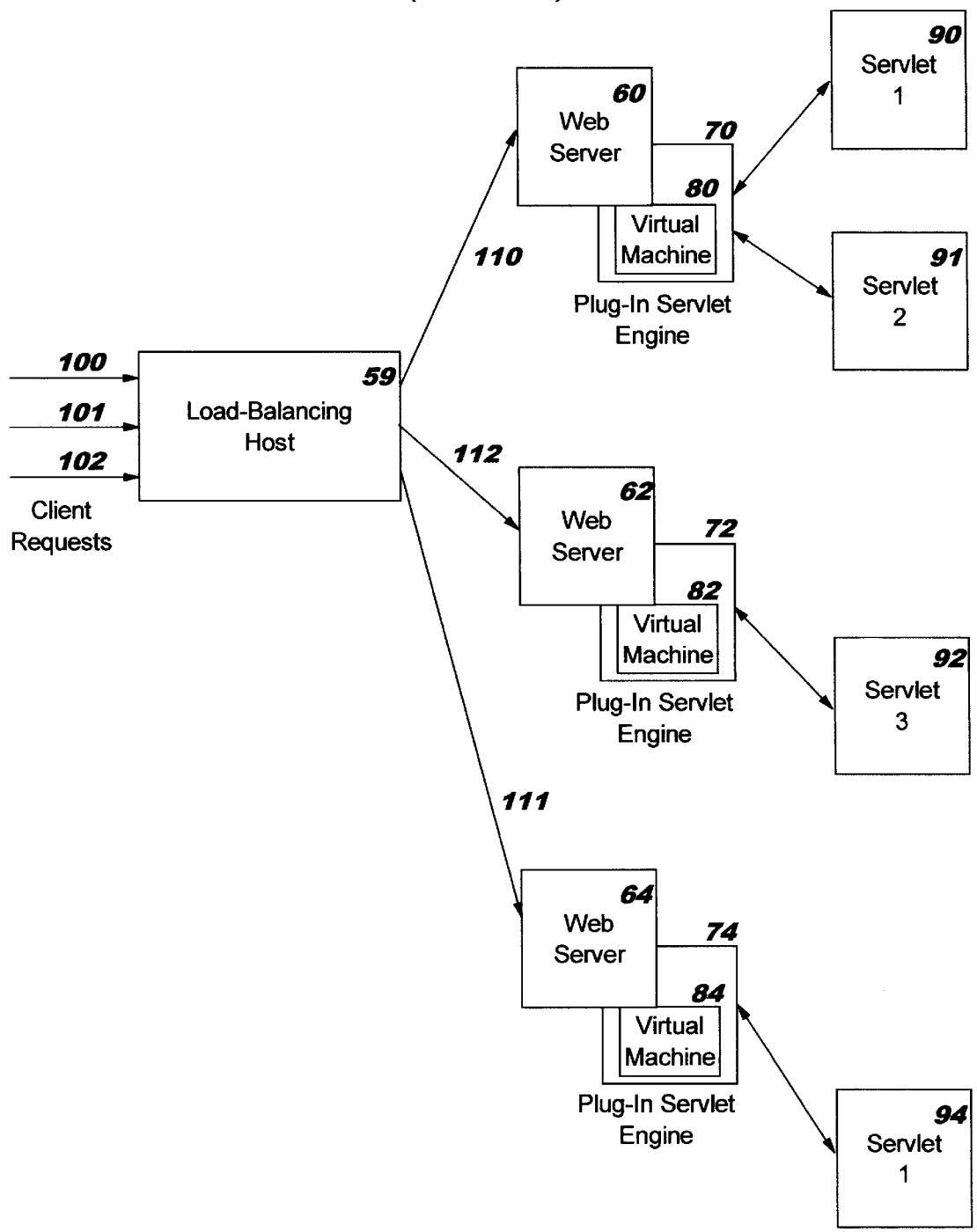
FIG. 3 illustrates a model of a clustered server network environment of the prior art, where each server is depicted as using a single virtual machine to support one or more servlets.

FIG. 3 illustrates a model of a clustered server network environment of the prior art, where each server is depicted as using a single virtual machine to support one or more servlets. For example, server 60 uses virtual machine 80, and server 62 uses virtual machine 82. In this environment, a load-balancing host 59 functions as a type of front-end processor to multiple Web servers 60, 62, and 64 which form a cluster of servers. (The number of servers that may be clustered is not limited to three: three servers are shown for illustrative purposes.) The load-balancing host 59 receives client requests 100, 101, 102 and then routes those requests (shown here as 110, 111, 112) to a server selected according to policies implemented in the load-balancing host software. Note that the requests 110, 111, 112 are shown being sent to specific Web servers: this is merely an example of a possible outcome of the load balancing process. While FIG. 3 shows specific servlets running in each server, any of these servlets may run on any of the servers. The designators in FIG. 3 are merely for illustrating that different servlets may be active at any one time. For example, servlet 1 is shown as executing in server 60 (as element 90) and also in server 64 (as element 94), but may execute on server 62 as well. Similarly, servlets 2 and 3 could execute on the other servers.

Clustering multiple servers as shown in FIG. 3 provides for increased capacity with which HTTP requests at a Web site can be processed. However, the performance problems that have been previously discussed regarding execution of multiple threads within a single process running on the server are not solved by this type of clustering: each of the clustered servers is still vulnerable to the problems of too many threads competing for time slices, possible overwriting of data among the servlets of the server, temporary or permanent unavailability of the server, and the restriction to a single execution environment per server.

The present invention solves these problems by providing virtual machine pooling, whereby more than one virtual machine may be running on each Web server. FIG. 4 shows one of the servers 60 of FIG. 3, enhanced with these multiple virtual machines. (While only server 60 is depicted in FIG. 4, the concepts illustrated here apply equally to any server executing in a Web environment, including the other servers 62 and 64 of FIG. 3.) A variable number of virtual machines may be pooled in each server. Three virtual machines 152, 154, and 156 are shown in FIG. 4 as an example of virtual machine pooling on server 60. The specific number of virtual machines in a pool depends on the processing capacity of the server on which that pool of virtual machines will execute. In the preferred embodiment, a configuration parameter will be used to specify the number of VMs to start at initialization, as further discussed below.

The number of virtual machines in the pool may be configured as none, which indicates that the virtual machine pooling features of the present invention are not being used. This capability allows processing in a clustered server environment to occur as in the prior art, providing backward compatibility. Because the inventive concepts of the present invention are not used in this situation, it will not be discussed further.

Figure 4:
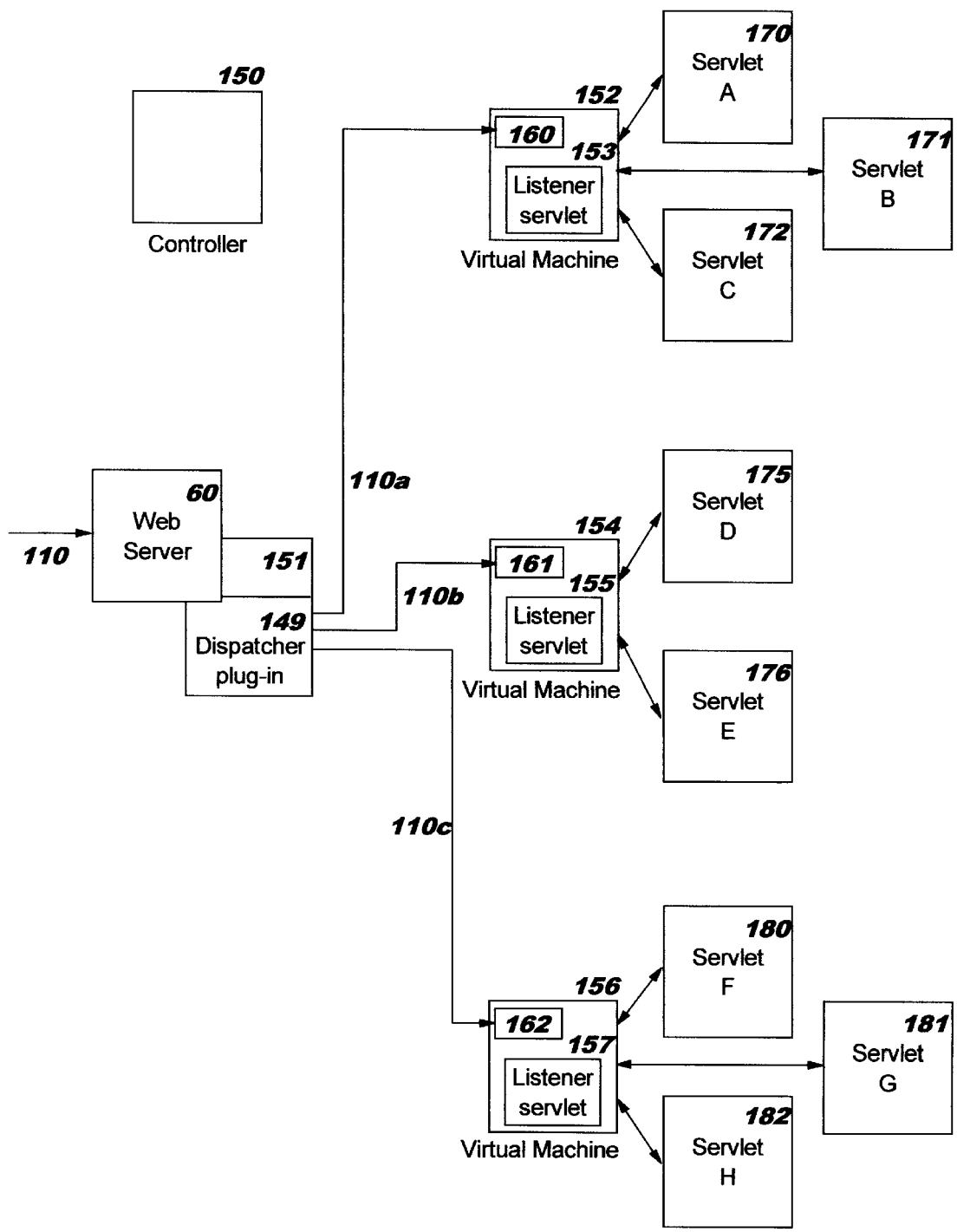
FIG. 4 illustrates a network configuration using the present invention, and shows how the present invention extends the environment of FIG. 3 by adding multiple virtual machines to a server.

As shown in FIG. 4, the server 60 has a plug-in 151 running on it. (A plug-in is executable code that extends the functionality of the Web server, and is merely one form in which this component of the preferred embodiment may be packaged.) This plug-in 151 includes a dispatcher component 149, which receives client requests 110 from the Web server 60, and then routes those requests to one of the virtual machines 152, 154, 156. The requests are received into an application queue, where they remain until assigned to a servlet for execution. The application queues are shown here as queues 160, 161, 162. Each virtual machine has a listener servlet (shown as 153, 155, and 157) running on it. The requests are removed from the application queue by the listener servlet, which assigns the removed request to an available servlet. For example, dispatcher 149 sends a request to VM 152, by sending the request to application queue 160. The listener servlet 153 will (at some point) take that request from the queue, and assign it to a servlet (such as 170, 171, 172) which is available to run on VM 152.

A given virtual machine is responsible for running a particular group of servlets, which may (either separately or together) comprise an application. For example, the servlets 170, 171, and 172 run on virtual machine 152. These servlets may execute as separate applications, or they may operate together as a single application. The number of servlets comprising a particular application is application-dependent: groups of two and three servlets have been shown in FIG. 4 for illustrative purposes. As previously stated, some servlets may require a particular JVM; alternatively, other servlets may be able to run on any JVM from which they are invoked.

A controller 150 is shown in FIG. 4. This controller may function independently of the Web server, and is therefore shown as being a separate process. Alternatively, the controller may reside within the server. The controller is responsible for starting the VMs (and stopping them, when applicable), monitoring execution of the VMs, and may also handle administrative functions. In the preferred embodiment, a file is associated with this controller, which will be referred to herein as the "Properties" file. Among the information stored in this file is the number of JVMs to start when the Web server is initialized. (Alternatively, this information could be coded directly into the controller implementation.) According to the preferred embodiment, when the Web server initializes, the plug-in 151 is also initialized. This plug-in 151 brings up the controller 150, and the controller then starts each JVM.

When an HTTP request 100, 101, 102 from a client is sent from the load-balancing host 59 as request 110, 111, 112 to one of the Web servers 60, 62, 64, the request will be passed from the Web server to the dispatcher 149 if servlet processing is required for this request (e.g. a servlet-identifying string will appear as part of the host destination address in the Uniform Resource Locator, or "URL", of the request). The same technique applies to any of the servers in the clustered server environment of FIG. 3, and may be used in the absence of a load-balancing host as well (i.e. where requests are sent directly from the client to a Web server such as 60, 62, or 64). For illustrative purposes, assume the request is sent to Web server 60, and is designated for processing by one of the servlets 170, 171, or 172.

When the Web server 60 gets the request 110, the request will be forwarded to the dispatcher 149. The request will contain a URL that identifies the target machine for processing this request. As part of the process of configuring the virtual machine pool, one or more URL masks will have been associated with each virtual machine, as will be further discussed below with reference to FIG. 5. The dispatcher 149 is responsible for inspecting the URL of each incoming request, and comparing the URL to the URL masks for each virtual machine. In this way, the dispatcher 149 determines which virtual machine (such as 152, 154, or 156) to forward the request to. Each of these virtual machines includes an application queue that will receive the requests from a specific port, and a listener servlet that monitors its associated application queue. The listener servlet then assigns requests from this queue to servlets, as stated previously.

In the preferred embodiment, the dispatcher 149 passes the request on to the proper listener servlet (that is, the one identified by the syntax of the URL in the HTTP request) by sending the request to a specific TCP/IP socket associated with that virtual machine. The socket is an address that identifies the target machine, and a specific port number on that machine.

The function of a servlet is application-specific. The preferred embodiment of the present invention does not require the programmer to add any logic to the servlet code he has already written: virtual machine pooling operates transparently from the servlet's point of view. By not requiring the programmer of a servlet to add new code, or change existing code, the advantages of the present invention can be incorporated into a server environment with minimum disruption and effort.

FIG. 5 illustrates the logic used in the preferred embodiment to implement the virtual machine pooling of the present invention, and its advantageous features. FIG. 5A represents the logic that may be used to provide information needed to configure the pooling function. FIG. 5B illustrates how the controller 150 reads these pooling parameters from a file, and starts the proper number of virtual machines. FIG. 5C depicts the logic involved with receiving requests at the server, and passing those requests to the dispatcher. FIG. 5D illustrates the functioning of the dispatcher, and FIG. 5E illustrates a listener servlet.

Figure 5A:
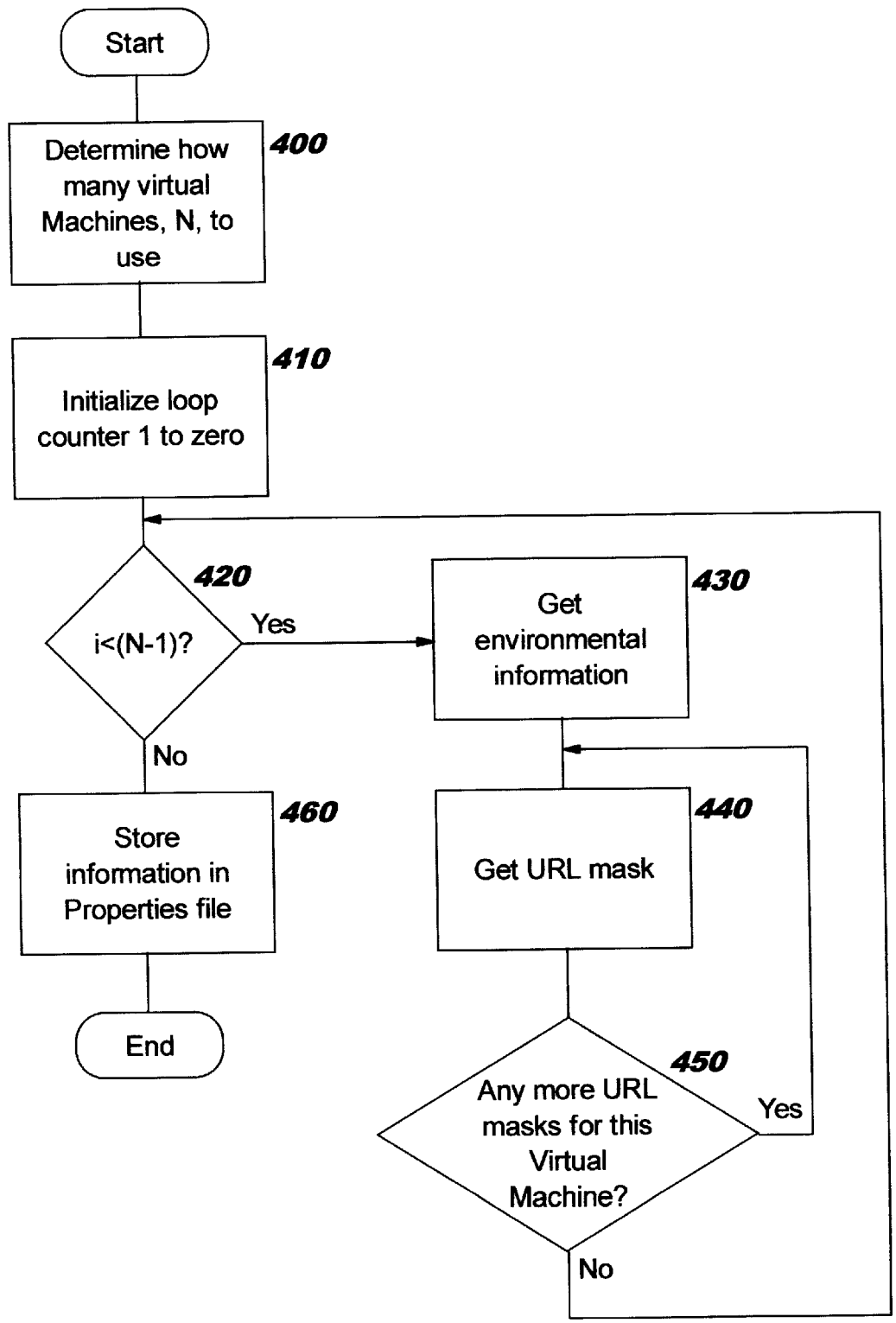
FIGS. 5A–5E illustrate a flow chart which sets forth the logic involved with the present invention to implement and use multiple virtual machines.

The configuration process of the preferred embodiment begins at Step 400 of FIG. 5A, by determining how many virtual machines should be used for the pool. The value entered at Step 400 will be some number, N. As stated previously, the number of VMs that can function efficiently in a particular server is preferably used as an upper bound on this value. The manner in which an upper bound is determined, and communicated from the user, does not form part of the present invention. At Step 410, a loop counter, I, is initialized to zero, for use in obtaining the remaining information for the N virtual machines. A test is made at Step 420 to determine if the value of the loop counter is less than the value (N−1). If this test has a positive response, then there are still more virtual machines for which configuration information is required, and control transfers to Step 430. Otherwise, all the configuration information required for virtual machine pools has been obtained, and control transfers to Step 460.

At Step 430, the environment information for a particular virtual machine is obtained. In the preferred embodiment, this environment information includes such things as the version of the virtual machine, the class path and library path to be used for locating code used by the servlets, as well as the binary path of the virtual machine's executable objects. At Step 440, a URL mask to be used for this virtual machine is entered. A URL mask is address information against which the address in an incoming request can be compared, which may optionally contain wildcard symbols that will cause any address to be considered as a match. When the incoming address matches the URL mask, this indicates that the request should be sent to the application queue in this particular virtual machine. Any number of URL masks can be defined for one virtual machine. This is indicated by the test at Step 450, which asks if there are more URL masks to enter, and returns to Step 440 if the response is positive. Control will loop through Steps 440 and 450 until all the URL masks have been entered for this virtual machine, after which control transfers to Step 420. At Step 460, the configuration information for the virtual machine pool is stored. In the preferred embodiment, it is stored in a Properties file associated with the controller. (It will be obvious to one of ordinary skill in the art that the information can alternatively be stored incrementally, as it is obtained, without deviating from the inventive concepts of the present invention.)

Typically, a system administrator will invoke this process by selecting a configuration option from an administration interface to the Web server. This process may be repeated as necessary, whenever it is desired to change the existing values in the Properties file.

Figure 5B:
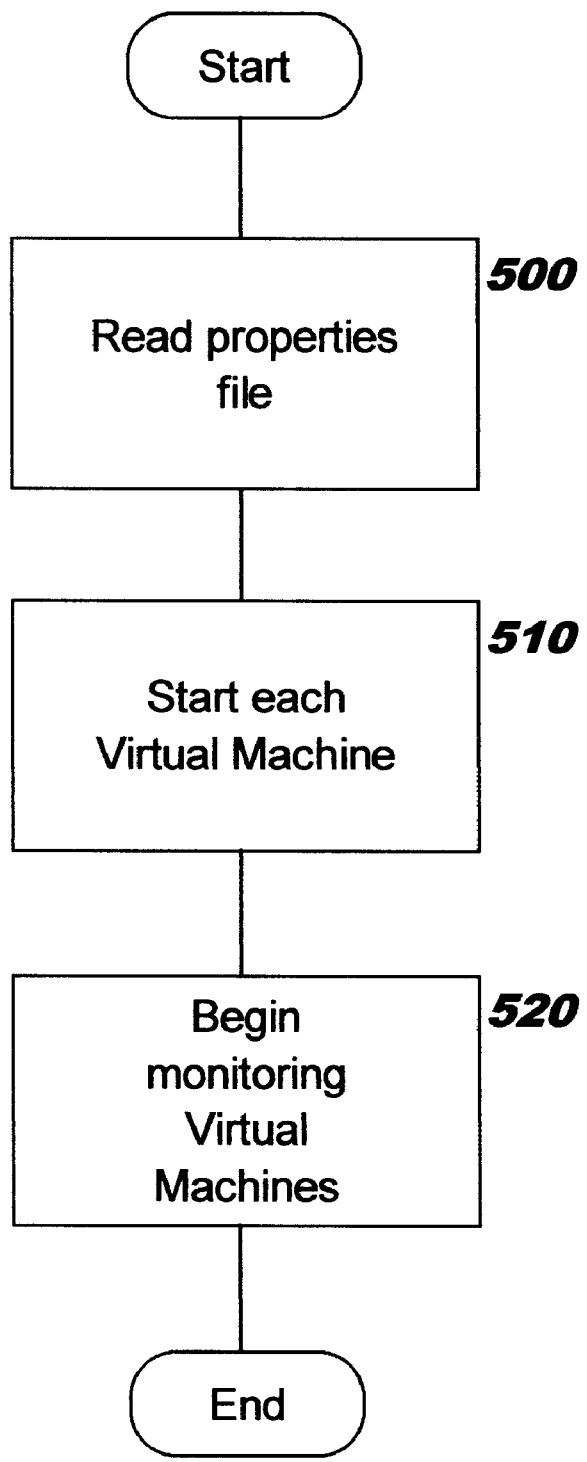

FIG. 5B shows a preferred embodiment of the logic used by the controller to start up the virtual machines. At Step 500, the configuration parameters are read from the Properties file associated with the controller. Step 510 indicates that the controller starts each of the N virtual machines, where the number N was obtained according to FIG. 5A. At Step 520, the controller begins monitoring execution of the virtual machines, the start-up process having completed. This monitoring process comprises periodically checking the virtual machines to determine how busy each machine is. If this monitoring detects no activity in a virtual machine, it can be assumed that the VM has crashed or hung. The controller will then stop that VM and restart it, using procedures which are known to those of skill in the art.

Figure 5C:
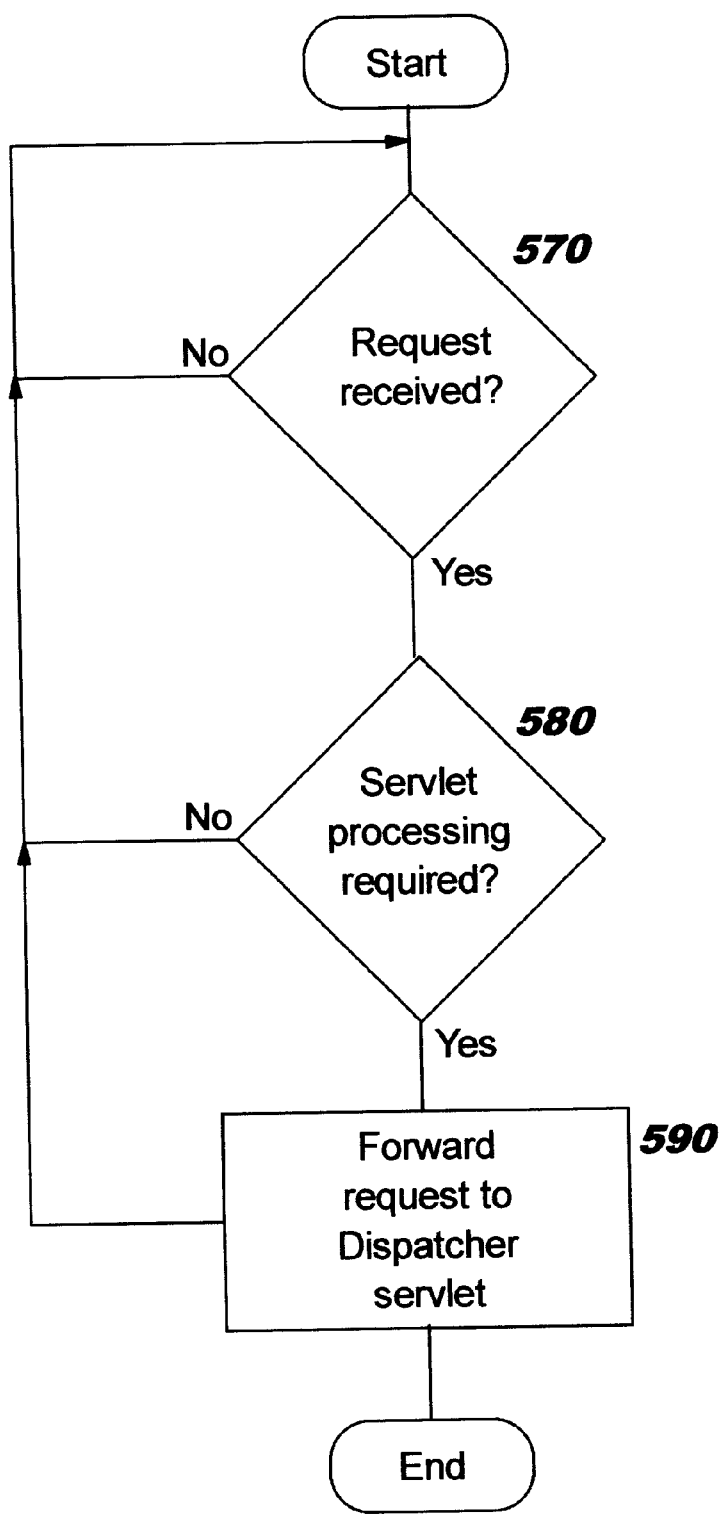

FIG. 5C depicts a preferred embodiment of the processing logic in the server (only as it pertains to the present invention), as it receives client requests and forwards them to the dispatcher. It will be obvious to one of ordinary skill in the art that the server is much more complicated, and performs many more functions, than shown in FIG. 5C. Step 560 indicates that the server begins monitoring for incoming requests from the client. Steps 570 through 590 form a loop that executes for the duration of the processing of the server. Here, Step 570 checks to see if an incoming request was received. If not, it continues monitoring by returning to Step 570. If a request was received, Step 580 asks whether servlet processing is required for this request. If this question has a positive response, control transfers to Step 590; otherwise, this request is not pertinent to the present invention, so control is shown as simply returning to Step 570 (although normal processing would actually be performed for the request). At Step 590, the request is forwarded to the dispatcher, to be handled according to the process shown in FIG. 5D. It will be obvious to one of ordinary skill in the art that the technique shown for Step 570 may be implemented in a number of ways, and does not comprise uninterrupted checking for a request: FIG. 5C shows a constantly repeating loop for the purpose of illustrating the required result. Instead, polling may be performed periodically, or an interrupt mechanism may be used whereby a notification event is generated when a request arrives. The specific technique for determining the presence of incoming events does not form part of the present invention.

Figure 5D:
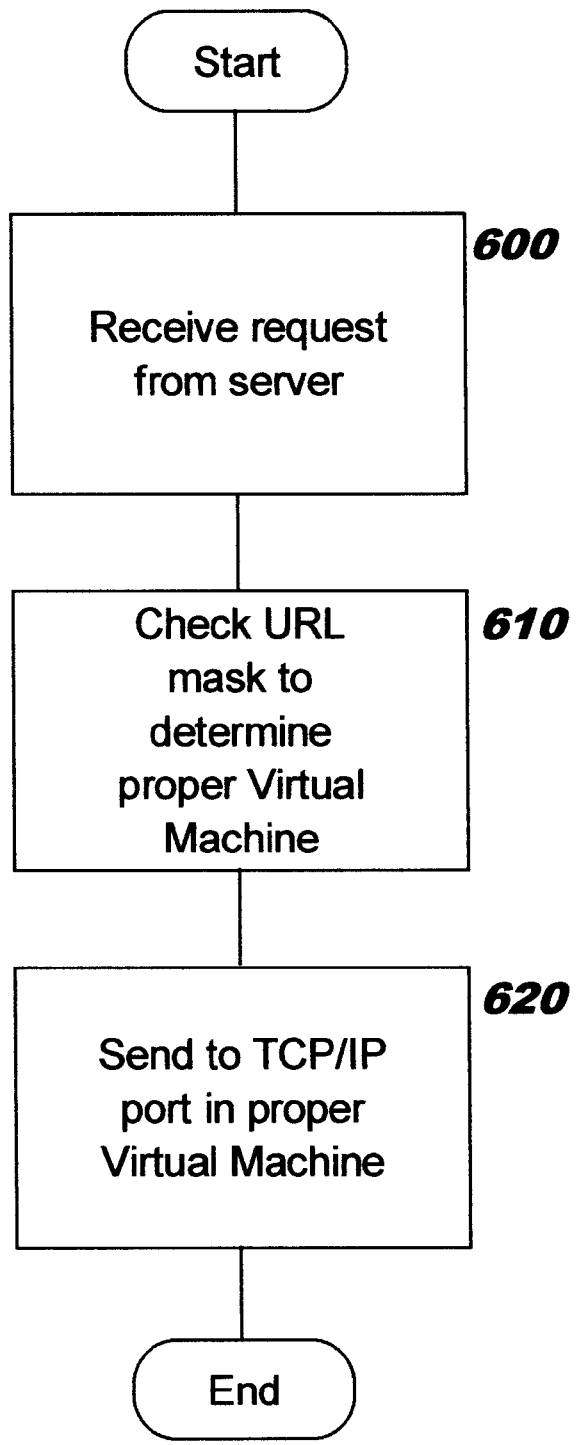

FIG. 5D shows a preferred embodiment of the processing of the dispatcher. At Step 600, the request sent by the server in Step 590 of FIG. 5C is received by the dispatcher. At Step 610, the dispatcher compares the URL in this request to the list of URL masks defined for each of the virtual machines, until a match is found. When a match is found, the comparison stops, and the request is forwarded to the TCP/IP port of the virtual machine having the matching URL mask at Step 620. This receive, compare, and forward logic is repeated for each request that is received by the dispatcher.

In an optional feature of the preferred embodiment, allowance is made for the case in which there is no matching URL mask. According to this feature (not shown in FIG. 5D), one of the virtual machines will be designated—for example by an entry in the Properties file—as a default virtual machine, and all such requests with non-matching URLs will be sent to this virtual machine.

Figure 5E:
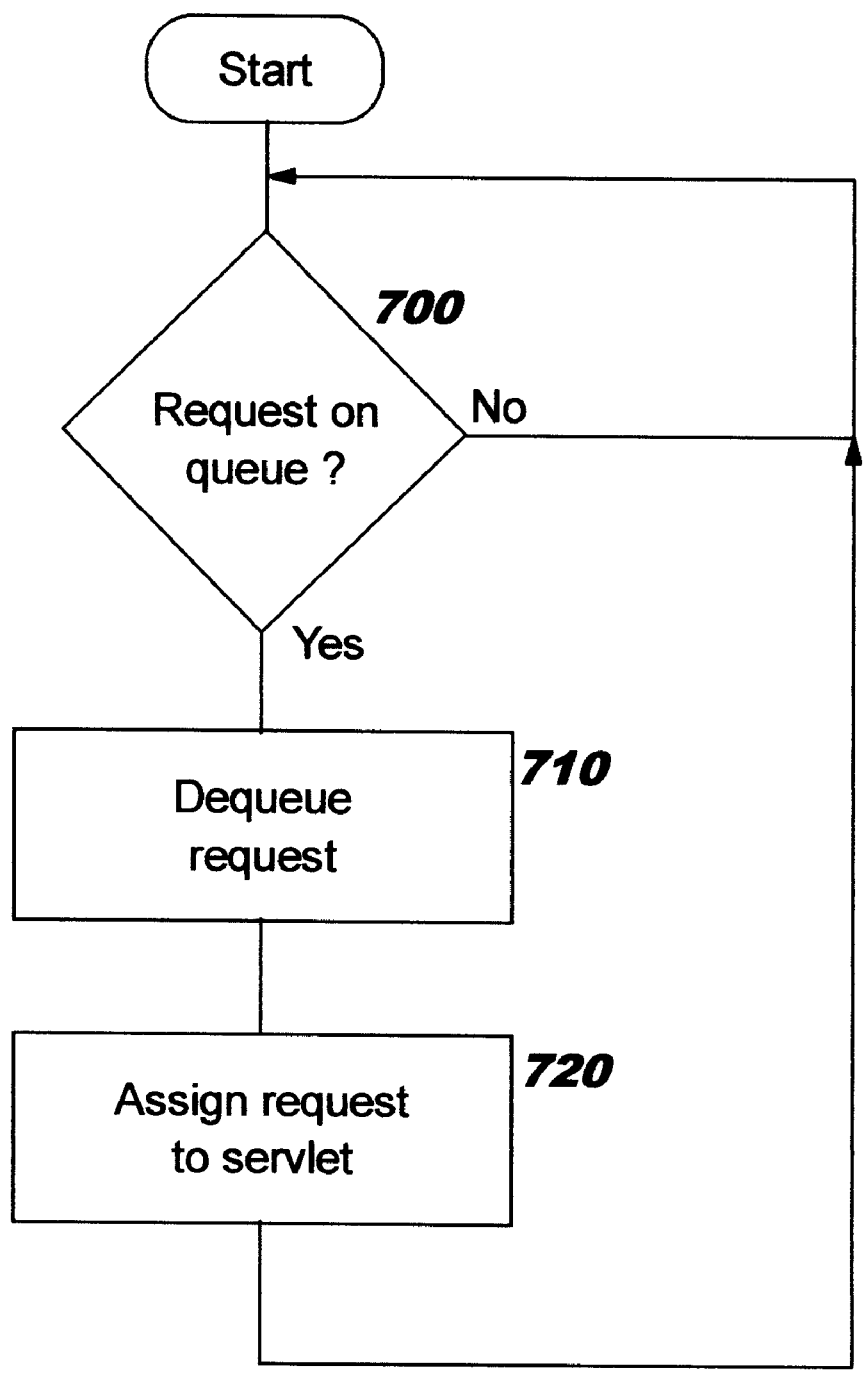

In FIG. 5E, the logic with which a listener servlet processes incoming requests is shown. The requests forwarded from the dispatcher arrive at the TCP/IP port for this virtual machine, and are put onto an application queue. This process is not shown in FIG. 5E, and is done using techniques which are well known in the art. For example, requests may be copied from the port onto the queue, or a pointer may be placed on the queue, where the pointer is an address of a memory location that is accessible to the virtual machine and that contains the data of the incoming request. Preferably, the application queue is a First-In, First-Out (FIFO) queue. At Step 700, the listener servlet checks the application queue to see if any requests have been received and queued. If not, then control returns to Step 700, where the queue will be checked again at some later time. If a request is queued, Step 710 will dequeue it, and Step 720 assigns the request to an available servlet. The servlet then processes the request to completion, at which time it again becomes available for a subsequent assignment. The logic of FIG. 5E is the same in the listener servlets of each of the virtual machines.

By allowing multiple virtual machines to execute per server, the processing capacity of the server can be greatly increased. The pooling approach which has been defined enables the requests coming in to the Web server to be routed to, and processed by, these multiple virtual machines. Because each virtual machine has its own execution process, the multiple threads required to handle a given number of servlets are now spread among more than just one process, enabling each thread to be serviced (that is, to receive a CPU time slice for execution) more frequently. Thus, the number of executing servlets can be scaled without degrading the overall performance of the server.

Further, pooling the virtual machines solves the problem of threads being able to inadvertently overwrite each other's data. Because the threads of one application can now run in a separate virtual machine from the threads of another application, and an application has access only to the resources of its own virtual machine, the resources of the applications are protected from other applications automatically. No longer can one application write into the memory being used by another application, because different memory locations are assigned to each virtual machine. One application's open files are no longer available to other applications, because the file is seen as being open only within the VM that opened it.

The problem of a crash or hang by an executing thread is also solved by pooling the virtual machines in this manner. Since there can now be many processes running in a server, only the one process where the crash or hang occurs is halted: other processes will be unaffected, and the server will continue to do productive work. Additionally, the garbage collection function will no longer cause a temporary halt of the entire server: garbage collection within one virtual machine may cause a temporary halt for that virtual machine, but the other virtual machines will continue executing.

Because a separate environment can be configured for each virtual machine in the pool, it is now possible to run multiple environments in one server at the same time. For example, different versions of Java can be run concurrently, including versions from different vendors. This introduces flexibility into the server that does not currently exist.

Debugging servlets will be easier to accomplish using this pooled virtual machine environment. In the prior art, servlets were very difficult to debug because they execute as extensions of other code (as previously discussed). Many differences can result in the code that executes as an extension of one server compared to using that same code as an extension of another server. For example, the address at which the executable code is loaded will vary, and further differences may be introduced by the virtual machine (e.g. if it is required to perform byte swapping for changes in the Endian format in one server, but not in another). To make the task of debugging simpler, the concept of remote debuggers is known in the art, whereby the virtual machine in which the executable code is to be debugged must be started in a specific mode. With virtual machine pooling, this debug mode setting can now be limited to one (or more, as desired) of the virtual machines running on the server: the rest of the virtual machines can continue functioning normally, not in debug mode, so that applications and debugging can execute concurrently within the server environment.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

What is claimed:

1. In a computing environment having a connection to a network, computer readable code readable by a computer system in said environment, for improving server performance by pooling virtual machines, comprising:

a subprocess for executing a plurality of virtual machines on a server;

a subprocess for executing a plurality of servlets on each of said virtual machines;

a subprocess for receiving a plurality of client requests at said server; and a subprocess for dispatching each of said received client requests to selected ones of said plurality of virtual machines for execution by said servlets.

2. Computer readable code for improving server performance by pooling virtual machines according to claim 1, wherein:

each of said virtual machines has a queue for receiving incoming client requests; and said subprocess for dispatching further comprises a subprocess for dispatching each of said received client requests to said queue of said selected ones of said plurality of virtual machines; and further comprising;

a subprocess for queuing said dispatched client requests upon receipt by each of said virtual machines;

a subprocess for determining, at each virtual machine whether any of said plurality of servlets executing on said virtual machine is available for performing work; and a subprocess for dequeuing individual ones of said queued client requests and forwarding each of said dequeued individual ones to a particular one of said servlets which is available for performing work.

3. Computer readable code for improving server performance by pooling virtual machines according to claim 1, wherein said subprocess for dispatching further comprises a subprocess for selecting each of said selected ones of said plurality of virtual machines using a Uniform Resource Locator (URL) mask.

4. Computer readable code for improving server performance by pooling virtual machines according to claim 1, further comprising:

a subprocess for obtaining configuration information for said plurality of virtual machines, said configuration information enabling a user to specify a number of said plurality of virtual machines to execute on said server.

5. Computer readable code for improving server performance by pooling virtual machines according to claim 1, wherein said virtual machines are Java virtual machines.

6. Computer readable code for improving server performance by pooling virtual machines according to claim 1, further comprising:

a subprocess for receiving said dispatched client requests by each of said selected virtual machines;

a subprocess for determining, at each virtual machine, whether any particular one of said plurality of servlets executing on said virtual machine is available for performing work; and a subprocess for assigning individual ones of said received client requests to said particular one of said servlets which is available for performing work.

7. A system for improving server performance by pooling virtual machines in a computing environment having a connection to a network, comprising:

means for executing a plurality of virtual machines on a server; means for executing a plurality of servlets on each of said virtual machines;

means for receiving a plurality of client requests at said server; and means for dispatching each of said received client requests to selected ones of said plurality of virtual machines for execution by said servlets.

8. The system for improving server performance by pooling virtual machines according to claim 7, wherein:

each of said virtual machines has a queue for receiving incoming client requests; and said means for dispatching further comprises means for dispatching each of said received client requests to said queue of said selected ones of said plurality of virtual machines; and further means for queuing said dispatched client requests upon receipt by each of said virtual machines;

means for determining at each virtual machine, whether any of said plurality of servlets executing on said virtual machine is available for performing work; and means for dequeuing individual ones of said queued client requests and forwarding each of said dequeued individual ones to a particular one of said servlets which is available for performing work.

9. The system for improving server performance by pooling virtual machines according to claim 7, wherein said means for dispatching further comprises means for selecting each of said selected ones of said plurality of virtual machines using a Uniform Resource Locator (URL) mask.

10. The system for improving server performance by pooling virtual machines according to claim 7, further comprising:

means for obtaining configuration information for said plurality of virtual machines, said configuration information enabling a user to specify a number of said plurality of virtual machines to execute on said server.

11. The system for improving server performance by pooling virtual machines according to claim 7, wherein said virtual machines are Java virtual machines.

12. The system for improving server performance by pooling virtual machines according to claim 7, further comprising:

means for receiving said dispatched client requests by each of said selected virtual machines;

means for determining, at each virtual machine, whether any particular one of said plurality of servlets executing on said virtual machine is available for performing work; and means for assigning individual ones of said received client requests to said particular one of said servlets which is available for performing work.

13. A method for improving server performance by pooling virtual machines in a computing environment having a connection to a network, comprising the steps of:

executing a plurality of virtual machines on a server;

executing a plurality of servlets on each of said virtual machines;

receiving a plurality of client requests at said server; and dispatching each of said received client requests to selected ones of said plurality of virtual machines for execution by said servlets.

14. The method for improving server performance by pooling virtual machines according to claim 13, wherein:

each of said virtual machines has a queue for receiving incoming client requests; and said dispatching step further comprises the step of dispatching each of said received client requests to said queue of said selected ones of said plurality of virtual machines; and further comprising the steps of:

queuing said dispatched client requests upon receipt by each of said virtual machines;

determining, at each virtual machine, whether any of said plurality of servlets executing on said virtual machine is available for performing work; and dequeuing individual ones of said queued client requests and forwarding each of said dequeued individual ones to a particular one of said servlets which is available for performing work.

15. The method for improving server performance by pooling virtual machines according to claim 13, wherein said dispatching step further comprises the step of selecting each of said selected ones of said plurality of virtual machines using a Uniform Resource Locator (URL) mask.

16. The method for improving server performance by pooling virtual machines according to claim 13, further comprising the step of obtaining configuration information for said plurality of virtual machines, said configuration information enabling a user to specify a number of said plurality of virtual machines to execute on said server.

17. The method for improving server performance by pooling virtual machines according to claim 13, wherein said virtual machines are Java virtual machines.

18. The method for improving server performance by pooling virtual machines according to claim 13, further comprising the steps of:

receiving said dispatched client requests by each of said selected virtual machines;

determining, at each virtual machine, whether any particular one of said plurality of servlets executing on said virtual machine is available for performing work; and assigning individual ones of said received client requests to said particular one of said servlets which is available for performing work.

* * * * *